United States Patent
Sims

(10) Patent No.: US 8,739,585 B2
(45) Date of Patent: Jun. 3, 2014

(54) WHEEL SECURITY LOCK

(76) Inventor: Toby Jack Sims, Bedford, TX (US)

(*) Notice: Subject to any disclaimer, the term of this patent is extended or adjusted under 35 U.S.C. 154(b) by 0 days.

(21) Appl. No.: 13/620,604

(22) Filed: Sep. 14, 2012

(65) Prior Publication Data

US 2014/0077582 A1  Mar. 20, 2014

(51) Int. Cl.
*B60R 25/00* (2013.01)

(52) U.S. Cl.
USPC ............ 70/225; 70/226; 70/166; 70/232; 301/37.21

(58) Field of Classification Search
USPC ............ 70/225, 260, 166, 232, DIG. 57; 301/35.624, 37.21
See application file for complete search history.

(56) References Cited

U.S. PATENT DOCUMENTS

| | | | |
|---|---|---|---|
| 1,447,564 A | | 3/1923 | Norlund et al. |
| 2,124,035 A * | | 7/1938 | Hurd ............... 70/169 |
| 2,340,998 A | | 2/1944 | Sundell |
| 2,377,542 A * | | 6/1945 | Crew ............... 70/232 |
| 2,568,370 A | | 9/1951 | Scuderi |
| 2,722,822 A * | | 11/1955 | Thomas ............ 70/167 |
| 3,352,133 A * | | 11/1967 | Selleck ............ 70/259 |
| 3,534,570 A * | | 10/1970 | Mauro ............ 70/167 |
| 3,821,975 A * | | 7/1974 | Haker ............... 81/461 |
| 3,833,266 A * | | 9/1974 | Lamme ............ 301/37.21 |
| 3,874,258 A | | 4/1975 | Semola et al. |
| 3,918,764 A * | | 11/1975 | Lamme ............ 301/37.21 |
| 3,995,461 A | | 12/1976 | Hudson |
| 4,161,869 A * | | 7/1979 | Dixon ............... 70/166 |
| 4,649,620 A | | 3/1987 | Omori |
| 4,674,306 A * | | 6/1987 | Halpern ............ 70/233 |
| 4,724,692 A * | | 2/1988 | Turin et al. ........ 70/225 |
| 4,825,669 A * | | 5/1989 | Herrera ............ 70/163 |
| 4,856,307 A | | 8/1989 | Hauser |
| 4,869,633 A | | 9/1989 | Hayashi |
| 4,888,969 A * | | 12/1989 | Suroff ............... 70/226 |
| 5,007,260 A * | | 4/1991 | Sharp ............... 70/233 |
| 5,011,231 A * | | 4/1991 | Weber ............ 301/37.21 |
| 5,129,710 A | | 7/1992 | Knowles |
| 5,222,785 A * | | 6/1993 | Green ............ 301/37.371 |
| 5,301,527 A * | | 4/1994 | Pollard ............... 70/226 |
| 5,370,486 A * | | 12/1994 | Plummer ............ 411/430 |
| 5,503,465 A * | | 4/1996 | Price et al. ........ 301/37.374 |
| 5,797,659 A | | 8/1998 | Fuller |
| 5,853,228 A * | | 12/1998 | Patti et al. ........ 301/37.371 |
| 5,934,118 A * | | 8/1999 | Henness ............ 70/226 |
| 6,116,700 A * | | 9/2000 | Herrera ............ 301/111.02 |
| D432,006 S * | | 10/2000 | Hussaini ............ D8/397 |
| 6,321,623 B1 | | 11/2001 | Dykes et al. |
| 6,322,158 B1 * | | 11/2001 | Herrera ............ 301/111.04 |
| 6,419,326 B1 * | | 7/2002 | Rains ............... 301/37.21 |
| 6,609,401 B1 | | 8/2003 | Iskhakbayev |
| 7,673,482 B2 | | 3/2010 | Bosman |
| 2008/0127691 A1 * | | 6/2008 | Castillo et al. ........ 70/225 |

* cited by examiner

*Primary Examiner* — Suzanne Barrett
(74) *Attorney, Agent, or Firm* — John A. Thomas

(57) ABSTRACT

A wheel lock for a vehicle wheel of the type comprising a body having a central attachment flange and studs passing through it. A security plate has a front side and a rear side; the rear side has a plurality of first circumferentially spaced-apart openings arranged to receive wheel studs; each of the first circumferentially spaced-apart openings is sized to receive a lug nut threaded on a wheel stud. There is at least one second opening where the second opening also sized to receive a wheel stud. The front side has a cover over the first circumferentially spaced-apart openings preventing access to lug nuts threaded on corresponding wheel studs. The front side has a receptacle concentric with the second opening for receiving a lock lug. The lock lug has a threaded hole for engaging a wheel stud and a key recess for engagement with a corresponding key lug.

6 Claims, 6 Drawing Sheets

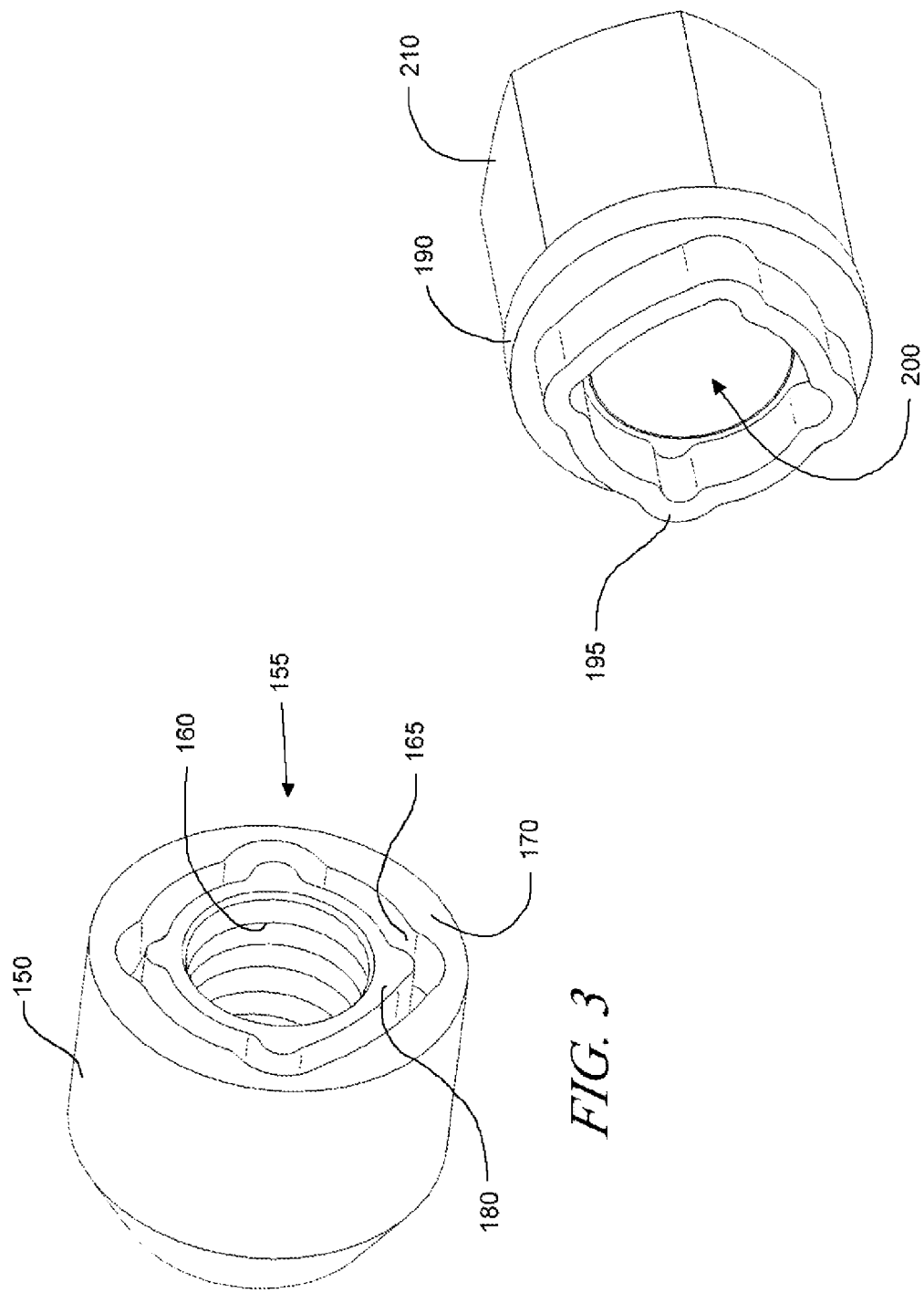

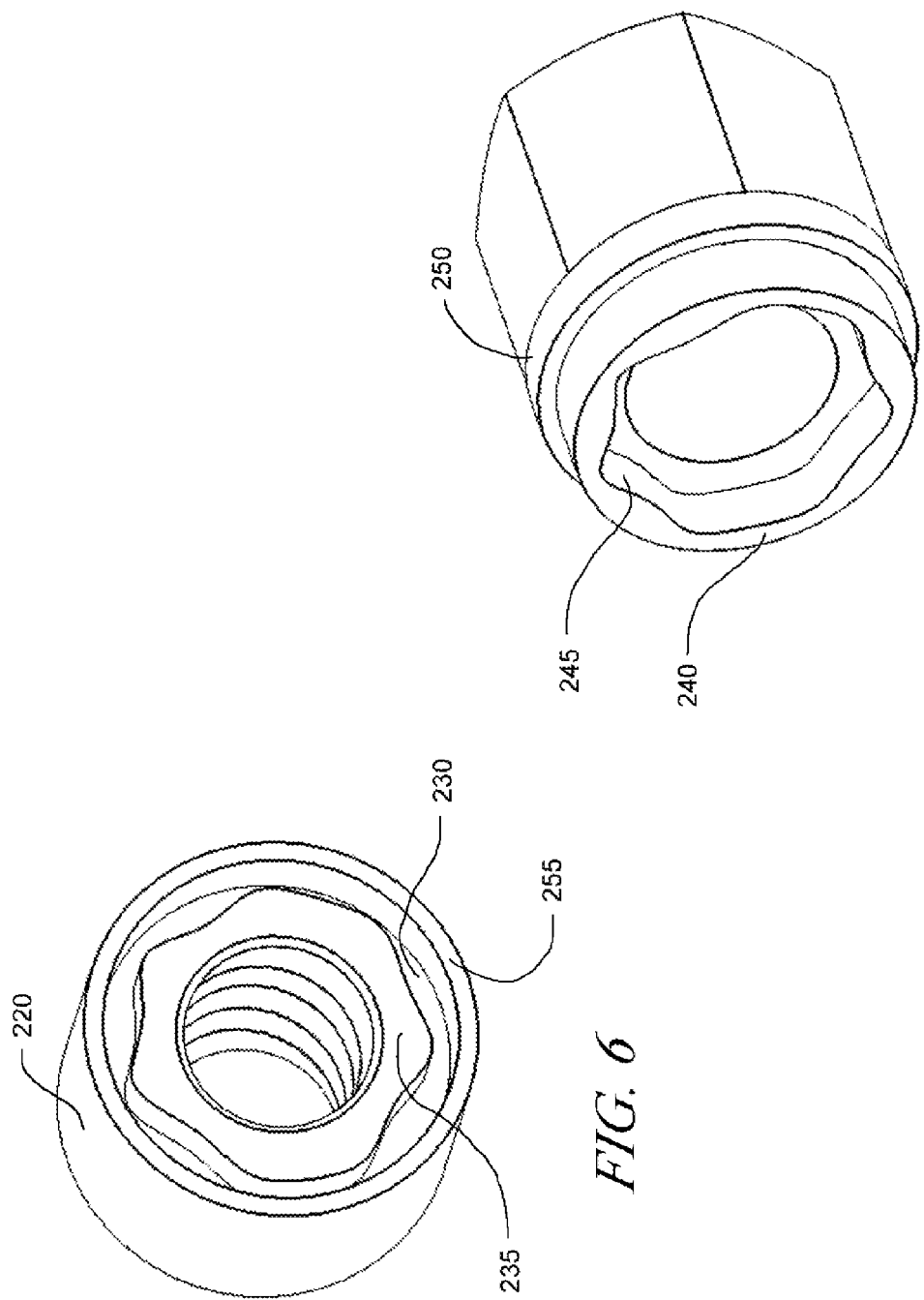

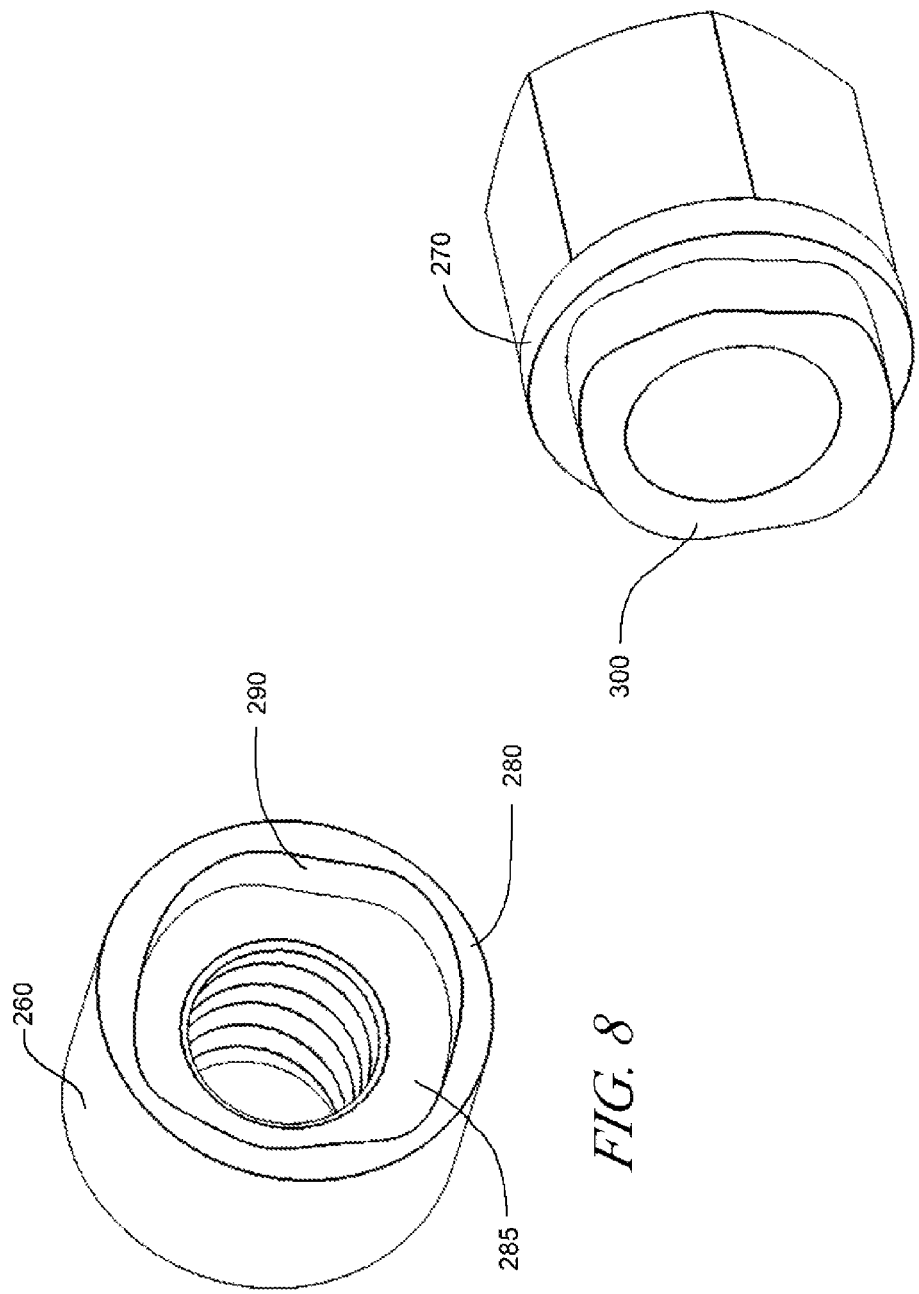

WHEEL SECURITY LOCK

BACKGROUND

1. Technical Field

The present disclosure relates to wheel locks for limiting the removability of wheels from vehicles, such as motor vehicles or trailers.

2. Background

Truck or automobile wheels are secured to axles by lug nuts threaded onto an array of threaded posts or studs projecting from the axle hub. Such wheels generally comprise a body having a central attachment flange. The lug nuts thread onto studs passing through holes in the attachment flange and are engaged by a simple wrench, socket, or tire tool. Just as simply, the lug nuts can be removed by thieves intent on stealing the valuable wheels, as well as the tires. This is problematic because wheels are an expensive component of any vehicle, especially trucks.

Efforts have been made in the past to provide devices to prevent unwanted removal of the lug nuts holding the wheel on the axle. Any such device must be easy to use without interfering with the ability to tighten the lug nuts completely. While many prior devices cover and protect a lug nut from easy removal, the devices themselves are subject to being pried apart or opened to allow access to the lug nut within.

Therefore a need exists for a wheel lock that is easy to use and resists improper removal.

DRAWINGS

FIG. 3 is a perspective view of an embodiment of a lock lug.

FIG. 4 is a perspective view of an embodiment of a key lug.

FIGS. 6 and 7 are perspective views of a second embodiment of a lock lug and a key lug.

FIGS. 8 and 9 are perspective views of a third embodiment of a lock lug and a key lug.

DETAILED DESCRIPTION

Figure 1:
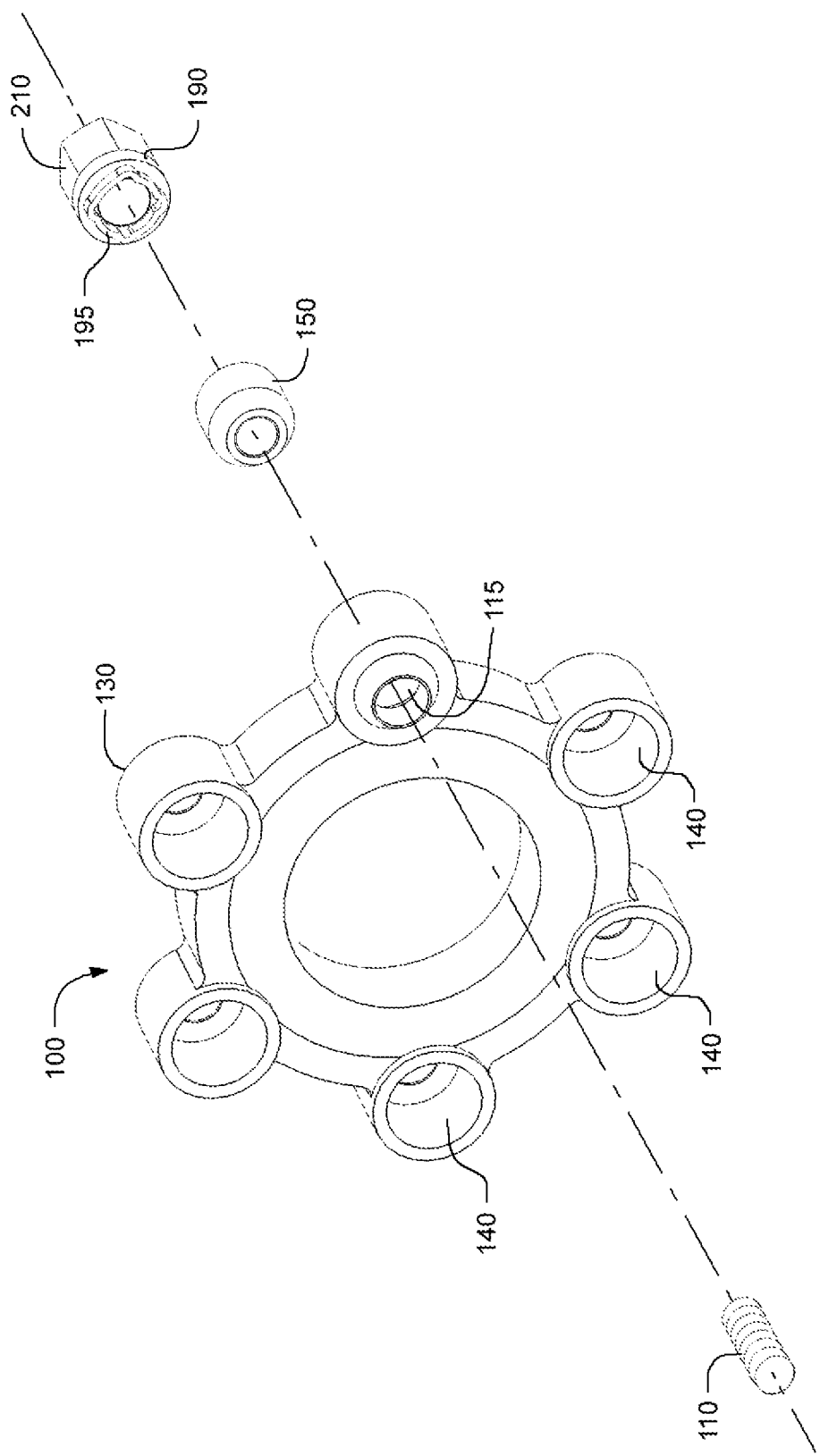
FIG. 1 is a perspective view of a wheel lock embodiment, viewed from the rear.

Truck or automobile wheels are secured to axles by lug nuts threaded onto an array of threaded posts or studs projecting from the axle hub. The number of studs varies, usually between four and eight. FIG. 1 shows an embodiment of a security plate (100) for the wheel lock where the number of studs is six. The reader should understand that the system may be adapted to wheels with more or fewer studs. FIG. 1 shows a typical stud (110). The security plate (100) may be made of any rigid machinable material, but a dense plastic, such as nylon, is satisfactory.

Figure 5:
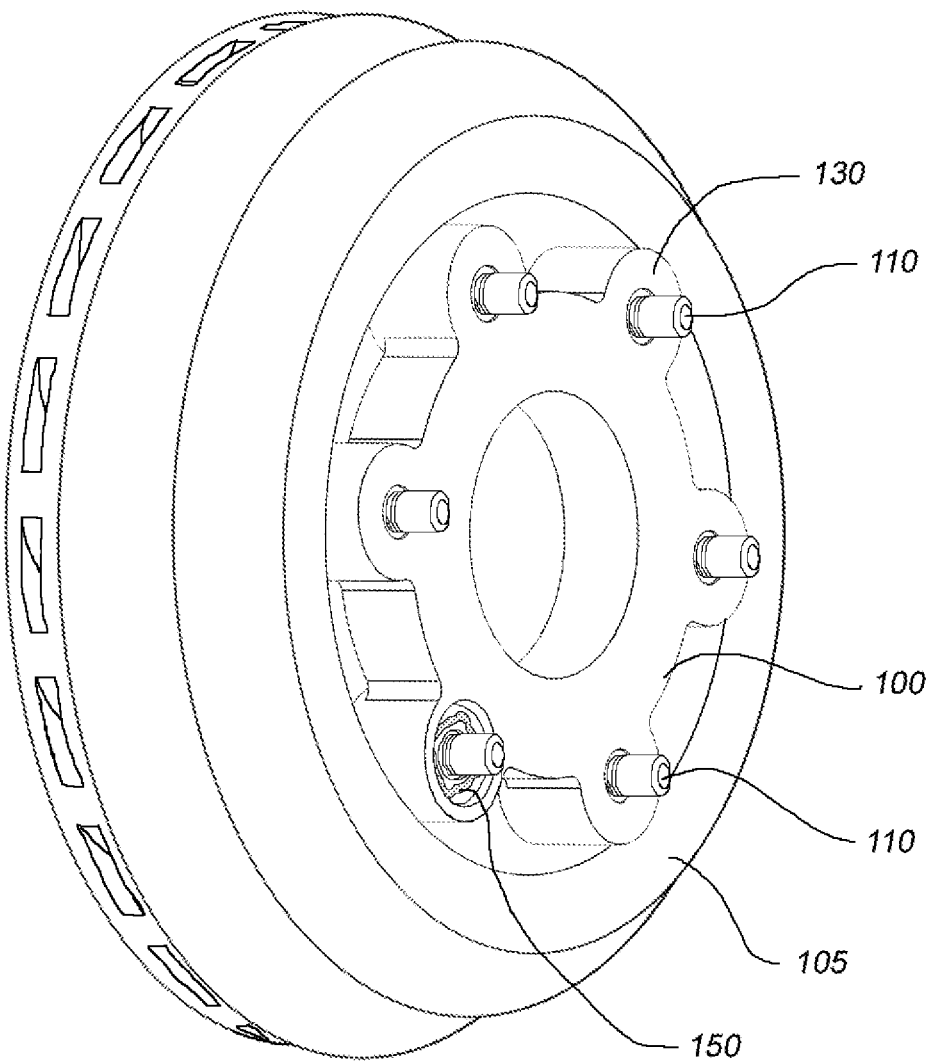
FIG. 5 is a perspective view of an embodiment situated on a wheel.

The studs (110) are of course passed through the mounting holes in a wheel flange (105) before the security plate (100) is fastened over them (see FIG. 5). First openings (140) in the rear of the security plate (100) are circumferentially spaced apart to cover the several studs (110) projecting from the axle. The other studs (110) mounted to the axle hub are not shown, but each stud (110) engages either one of the first openings (140) in the rear of the security plate (110) or a second opening (115). The first openings (140) are sized to receive lug nuts (not shown) screwed onto the studs (110). The second opening (115), as shown in FIG. 1, is sized to receive a wheel stud (110).

Figure 2:
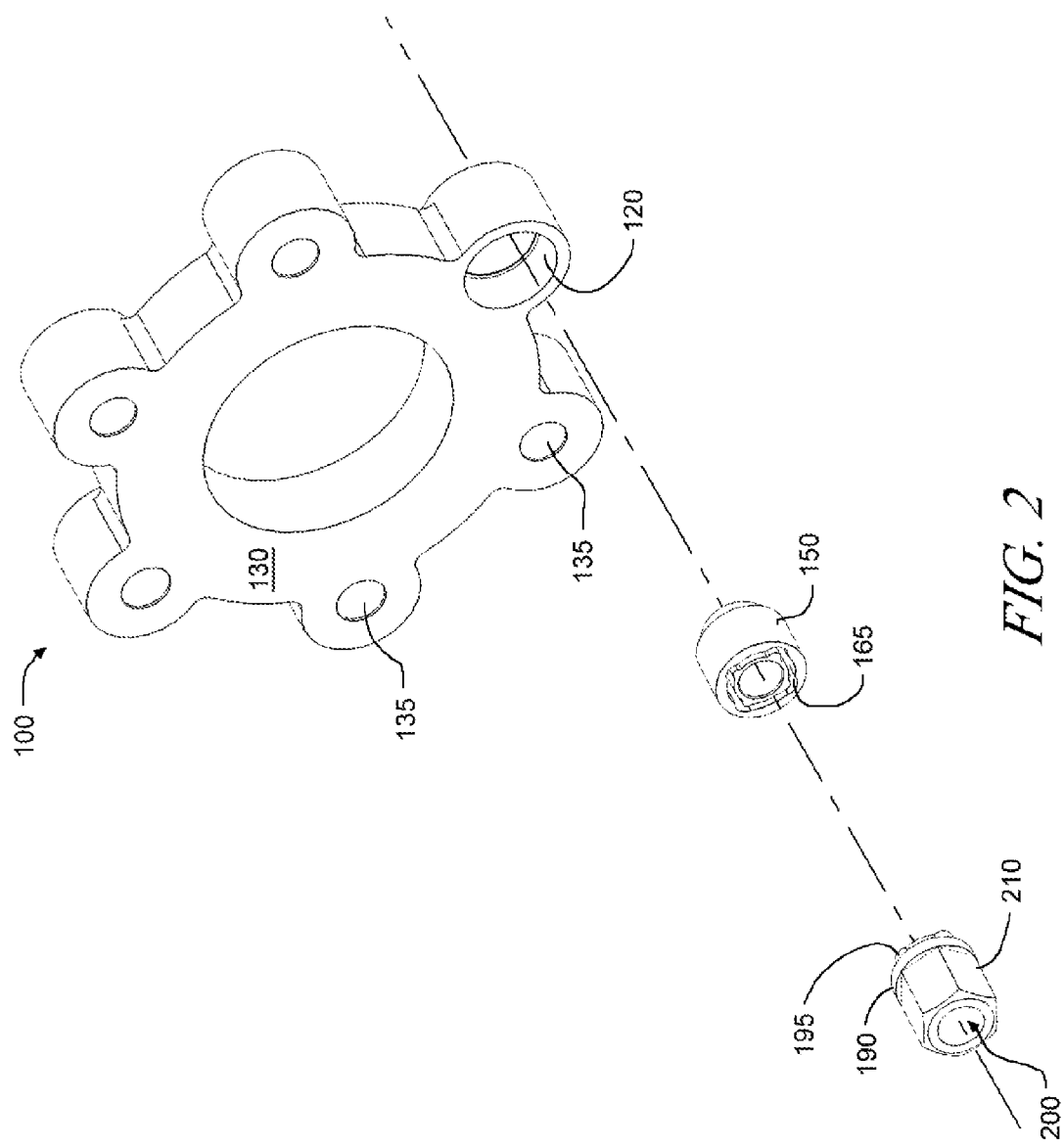
FIG. 2 is a perspective view of a wheel lock embodiment, viewed from the front.

FIG. 2 shows a view of the security plate (100) from its front side, this being the side projecting outward from the wheel flange (105). The wheel lug nuts are covered at positions (130) that cover the first openings (140) and are thus not accessible to anyone attempting to engage them with a wrench. These positions optionally have a hole (135) to allow passage of the wheel studs (110) through the security plate (100) at these positions (130). At least one stud (110) is shown aligned to insert into the security plate (100) through a second opening (115). A receptacle (120) in the security plate (100) opposite the second opening (115) and concentric with it receives a lock lug (150), as described below.

FIG. 3 shows the lock lug (150) in more detail. The lock lug (150) has threads (160) internally to its stud hole (155) for engaging the wheel stud (110) projecting through it. In use, the conventional lug nuts are fastened over all wheel studs (110) but one, and then the security plate (100) is placed over this assembly with the remaining wheel stud (110) projecting through the second opening (115) in the receptacle (120) for the lock lug (150). The lock lug (150) is then fastened to the remaining wheel stud (110). When all of the conventional lug nuts and the lock lug (150) are fastened to the respective studs (110), the security plate (100) is firmly held against the lug nuts because the lock lug (150) held in the receptacle (120) prevents it from moving. Since the conventional lug nuts cannot be removed before the lock lug (150) is removed, the wheel stud (110) engaging the lock lug (150) cannot be broken by removing the remaining lug nuts and twisting the wheel. The reader will see that more than one receptacle (120) and lock lug (150) could be provided in the security plate (100) if desired.

First Embodiment

The lock lug (150) has a key recess (165) extending substantially coaxially around the central stud hole (155) and axially aligned with the lock lug (150). The key recess (165) as shown, has a roughly circular, but preferably irregular, path around the stud hole (155). This irregular path of the key recess engages with a mating key projection (195) on the face of a key lug (190), as shown in FIG. 4. The key lug (190) has a central hole (200) to allow passage of the wheel stud (110) to the extent it projects beyond the lock lug (150). The key lug (190) preferably has flats (210) enabling it to be engaged with a wrench.

The reader should note that the path of the key recess (165) and the mating key projection (195) can be irregular in an indefinite number of ways, and the term "irregular" in this description should be taken to mean any such path that is not a regular geometric figure, such as a star or hexagon, although such regular paths could be used. This means that many different key patterns can be manufactured, further thwarting the efforts of thieves who may have somehow obtained a key lug (190) for a particular lock set.

The clearance between the lock lug (150) and the body of the security plate (100) at the receptacle (120) should be arbitrarily small to thwart a person attempting to grip the sides of the lock lug (150) with some tool. Further to this end, the key recess (165) in the lock lug defines an outer wall (170) and an inner wall (180) as shown in more detail in FIG. 3. The outer wall (170), cooperating with the inner wall (180) by the narrow key recess (165) also defeats attempts to insert some tool other than a key lug projection (195) into the key recess (165) and turn the lock lug (150).

Still further, the outer wall (170) and the inner wall (180) of the key recess (165) are substantially flush with one another and with the face of the security plate (100) at the location of the receptacle (120) for the lock lug (150). Again, this structure thwarts attempts to engage any part of the lock lug (150) with a tool other than a corresponding key lug (190).

FIG. 5 is a perspective view of an embodiment fastened to a wheel (105).

Second Embodiment

FIGS. 6 and 7 show a second embodiment of a lock lug (220) and key lug (250). In this embodiment, the key recess (230) of the lock lug (220) is recessed within the lock lug (220) body, as before, but only an inner wall (235) defines the mating surface for the key lug (250). The key lug (250) projection (240) as shown in FIG. 7, mates on its inner wall (245) with the inner wall (235) of the lock lug (220). The outer wall (255) of the mating recess (230) is substantially circular and does not contribute to the mating engagement.

Third Embodiment

FIGS. 8 and 9 show a third embodiment of a lock lug (260) and key lug (270). In this embodiment, an outer wall (280) of the lock lug (260) and an inner wall (290) of the lock lug (260) define a key recess (285). In this embodiment, the key recess (285) has an inner wall (290) congruent with the mating projection (300) of the key lug (270). The mating projection (300) on the key lug (270) engages this key recess (285) as previously described.

CONCLUSION

None of the description in this application should be read as implying that any particular element, step, or function is an essential element which must be included in the claim scope; the scope of patented subject matter is defined only by the allowed claims. Moreover, none of these claims are intended to invoke paragraph six of 35 U.S.C. Section 112 unless the exact words "means for" are used, followed by a gerund. The claims as filed are intended to be as comprehensive as possible, and no subject matter is intentionally relinquished, dedicated, or abandoned.

I claim:

1. A wheel lock for a vehicle wheel of the type comprising a body having a central attachment flange, the wheel being adapted for attachment to the vehicle by studs passing through the attachment flange, the wheel lock comprising:
    a security plate; the security plate comprising
        a front side and a rear side;
        the rear side having a plurality of first circumferentially spaced-apart openings arranged to receive wheel studs; each of the first circumferentially spaced-apart openings sized to receive a lug nut threaded on a wheel stud;
        the rear side having at least one second opening circumferentially spaced-apart from the first openings; the second opening sized to receive a wheel stud;
        the front side having covers over each of the first circumferentially spaced-apart openings preventing access to lug nuts threaded on corresponding wheel studs;
        the front side having a receptacle concentric with the second opening; and,
    a lock lug received and held by the receptacle; the lock lug comprising
        a threaded stud hole for threadably engaging a wheel stud passing through the threaded stud hole.

2. The wheel lock of claim 1, further comprising:
    the lock lug having a key recess; the key recess extending substantially coaxially around the threaded stud hole; and,
    a key lug; the key lug having a key projection mating with the key recess.

3. The wheel lock of claim 2, where the key recess has an irregular path.

4. The wheel lock of claim 2 where the key recess defines an outer wall and an inner wall.

5. The wheel lock of claim 4 where the inner wall and the outer wall of the key recess are substantially flush with the security plate when the lock lug engages a wheel stud.

6. A wheel lock for a vehicle wheel of the type comprising a body having a central attachment flange, the wheel being adapted for attachment to the vehicle by studs passing through the attachment flange, the wheel lock comprising:
    a security plate; the security plate comprising
        a front side and a rear side;
        the rear side having a plurality of first circumferentially spaced-apart openings arranged to receive wheel studs; each of the first circumferentially spaced-apart openings sized to receive a lug nut threaded on a wheel stud;
        the rear side having at least one second opening circumferentially spaced-apart from the first openings; the second opening sized to receive a wheel stud;
        the front side having covers over each of the first circumferentially spaced-apart openings preventing access to lug nuts threaded on corresponding wheel studs;
        the front side having a receptacle concentric with the second opening; and,
    a lock lug received and held by the receptacle; the lock lug comprising
        a threaded stud hole for threadably engaging a wheel stud passing through the threaded stud hole;
    the lock lug having a key recess; the key recess extending substantially coaxially around the threaded stud hole;
    a key lug; the key lug having a key projection mating with the key recess;
    the key recess defining an outer wall and an inner wall; and,
    the inner wall and the outer wall of the key recess being substantially flush with the security plate when the lock lug engages a wheel stud.

* * * * *